B. G. NICE.
BALL BEARING.
APPLICATION FILED SEPT. 19, 1913.
1,147,116.
Patented July 20, 1915.
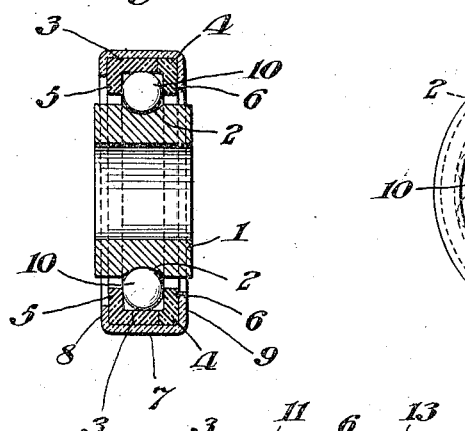
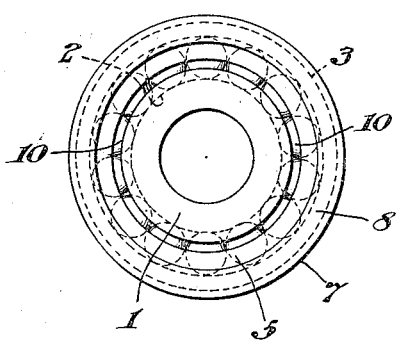
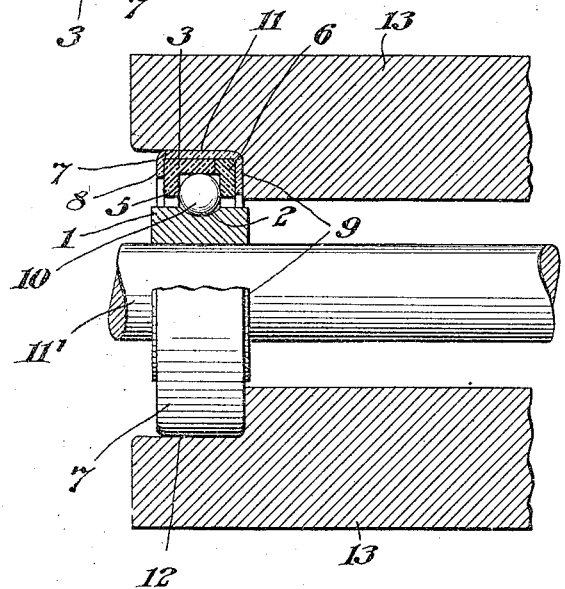
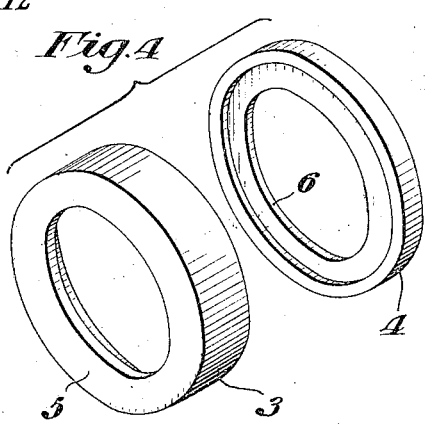
WITNESSES:
INVENTOR
Budd G. Nice,
BY
Chas. N. Butler
ATTORNEY.

UNITED STATES PATENT OFFICE.

BUDD G. NICE, OF OGONTZ, PENNSYLVANIA.

BALL-BEARING.

1,147,116.　　　　　Specification of Letters Patent.　　Patented July 20, 1915.

Application filed September 19, 1913.　Serial No. 790,591.

*To all whom it may concern:*

Be it known that I, BUDD G. NICE, a citizen of the United States, residing at Ogontz, in the county of Montgomery and State of Pennsylvania, have invented certain Improvements in Ball-Bearings, of which the following is a specification.

My invention is a ball bearing designed primarily to provide improved means for taking radial thrusts, and in its preferred form comprises a hard metal channeled sleeve or collar adapted to be fixed on a shaft, a hard metal channeled ring having unequal sections, a soft metal jacket telescoped on said ring and having inturned flanges engaging the sections thereof together, and balls disposed in said channels, whereby the collar and the ring with the jacket thereon are revoluble relatively to each other.

In the accompanying drawings, Figure 1 is a sectional view taken through the axis of a construction embodying my improvements; Fig. 2 is a side elevation of the same; Fig. 3 is a broken sectional view taken longitudinally through a shaft and bearing connected by my improved construction; and Fig. 4 is a perspective view of the dissociated ring sections previously shown in section.

The construction, as illustrated in the drawings, comprises the hard metal sleeve or collar 1 containing the circular channel or race 2, the hard metal angular ring sections 3 and 4 having the inwardly extending flanges 5 and 6, the soft metal jacket or band 7 disposed on the sections 3 and 4 and provided with the flanges 8 and 9 engaging the flanges 5 and 6 to hold the ring sections together, and the balls 10 disposed in the races formed in the collar and by the race ring sections.

The sleeve 1 is adapted to be fixed on a shaft 11 and the jacket 7 is adapted to be engaged in the seat 12 of a hub 13, whereby radial thrusts between the shaft and hub are efficiently carried without tendency to separate the race ring sections.

It will be observed that each ring section 3 provides a radial bearing, relatively to the axis of the sleeve 1, for each of the balls 10, while each of the angular ring sections 3 and 4 provides, in the respective flanges 5 and 6, a lateral bearing for each ball.

Having described my invention, I claim:

The combination of a sleeve containing a race, with a ring comprising angular sections forming a race concentric with and exterior to said race first named, a soft metal jacket on said ring whereby said sections are connected together, and balls disposed in said races, one of said sections being adapted for making contact with but two points of each ball simultaneously and the other of said sections being adapted for engaging but one point of each of said balls to hold them in proper relation to said section first named.

In testimony whereof, I have hereunto set my name this 10 day of September, 1913, in the presence of the subscribing witnesses.

BUDD G. NICE.

Witnesses:
JOSEPH G. DENNY, Jr.,
C. N. BUTLER.

Copies of this patent may be obtained for five cents each, by addressing the "Commissioner of Patents, Washington, D. C."